United States Patent Office.

CHARLES W. MOORE, OF SAN FRANCISCO, CALIFORNIA.

Letters Patent No. 91,862, dated June 29, 1869.

IMPROVED FLUX FOR SMELTING ORES OF GOLD, SILVER, AND OTHER METALS.

The Schedule referred to in these Letters Patent and making part of the same.

*To all whom it may concern:*

Be it known that I, CHARLES W. MOORE, of San Francisco city and county, and State of California, have invented a new and useful Improvement in the Art of Smelting and Reducing Ores, and Refining Metals, which I call "The Moore's Flux-Process;" and I do hereby declare that the following is a full and exact description thereof.

The nature of my invention consists in the use of fluor-spar, limestone, or dolomite, black oxide of manganese, and chloride of sodium, as a flux in smelting ores and metals.

To enable others skilled in the art to make and use my invention, I will proceed to describe the method of using it, and its operation.

I take, of fluor-spar, forty parts, or per centum; of limestone, (or dolomite,) twenty parts, or per centum; of black oxide of manganese, twenty parts, or per centum; and of chloride of sodium, twenty parts, or per centum; all these parts being by weight.

I use the ingredients of the flux either crushed to a powder, or in pieces of a considerable size, though I prefer to use them in a crushed state.

I use the combination above mentioned, as a flux, mixing the flux with the ore to be smelted, using the proportion (by weight) of one part of flux to four parts of ore.

I then treat the whole as in the ordinary methods of smelting with fluxes.

Some ores contain a percentage, or proportion of one or another of the ingredients of the flux above named, or the correlatives of such ingredients, and when that is the case, the proportion of such ingredient in the flux must be reduced by as much as the ore contains of such ingredients, or its correlatives. For instance, if the ore contains a per centum of chlorides, or is a chloride ore, then the chloride of sodium must be omitted, or reduced in proportion. Or, if the ore contains calcium, or its oxides, I omit the lime, or reduce the amount of lime in the flux, so that the lime in the flux, and the calcium, or its oxide in the ore, shall supply together the equivalent of the lime, or dolomite required in the flux.

The general rule is to mix the flux together, and to mix the flux with the ore, in the proportions severally stated above; but when an ingredient of the flux is found in the ore itself, the amount of such ingredient is to be counted in making up the proportions of the materials used in the flux, and the proportions used in mixing the ore and flux for smelting.

The benefits to be derived from the use of this flux, are the rapid and easy fluxing even of "rebellious" ores, and a more perfect separation of the metal from its ore, than has hitherto been attained by the use of fluxes.

What I claim as my invention, and desire to secure by Letters Patent, is—

The application and use of fluor-spar, black oxide of manganese, chloride of sodium, and limestone, or dolomite, in combination, as a flux, using for that purpose the combination of said ingredients above set forth, and any other substantially the same, and substantially in the manner and for the purposes above set forth.

CHAS. W. MOORE.

Witnesses:
SAML. L. CUTTER,
F. B. CLARK.